United States Patent
Rogers

(10) Patent No.: US 7,339,923 B2
(45) Date of Patent: *Mar. 4, 2008

(54) ENDPOINT PACKET SCHEDULING SYSTEM

(75) Inventor: Steven A Rogers, Portsmouth, NH (US)

(73) Assignee: Rivulet Communications, Inc., Portsmouth, NH (US)

( * ) Notice: Subject to any disclaimer, the term of this patent is extended or adjusted under 35 U.S.C. 154(b) by 701 days.

This patent is subject to a terminal disclaimer.

(21) Appl. No.: 10/697,103

(22) Filed: Oct. 31, 2003

(65) Prior Publication Data
US 2005/0094642 A1    May 5, 2005

(51) Int. Cl.
*G06F 15/16* (2006.01)
(52) U.S. Cl. ........................ 370/352; 370/458; 709/231
(58) Field of Classification Search ............... None
See application file for complete search history.

(56) References Cited

U.S. PATENT DOCUMENTS

| | | | |
|---|---|---|---|
| 4,745,593 A | 5/1988 | Stewart | |
| 4,821,259 A | 4/1989 | DeBruler et al. | |
| 5,271,000 A | 12/1993 | Engbersen et al. | |
| 5,373,504 A | 12/1994 | Tanaka et al. | |
| 5,408,465 A | 4/1995 | Gusella et al. | |
| 5,432,775 A | 7/1995 | Crayford | |
| 5,455,865 A | 10/1995 | Perlman | |
| 5,477,531 A | 12/1995 | McKee et al. | |
| 5,517,620 A | 5/1996 | Hashimoto et al. | |
| 5,541,921 A | 7/1996 | Swenson et al. | |
| 5,563,875 A | 10/1996 | Hefel et al. | |
| 5,610,903 A | 3/1997 | Crayford | |
| 5,734,656 A | 3/1998 | Prince et al. | |
| 5,774,668 A | 6/1998 | Choquier et al. | |
| 5,781,534 A | 7/1998 | Perlman et al. | |
| 5,859,835 A | 1/1999 | Varma | |
| 5,859,979 A | 1/1999 | Tung et al. | |
| 5,917,822 A | 6/1999 | Lyles et al. | |

(Continued)

FOREIGN PATENT DOCUMENTS

EP    0827307 A2    3/1998

(Continued)

OTHER PUBLICATIONS

IEEE Communications Magazine Oct. 2003; Topics in Internet Technology; "Packet Sequencing a Deterministic Protocol for Qos in IP Networks"; Sean S. B. Moore and Curtis A. Siller, Jr., Cetacean Networks, Inc; Abstract pp. 98-107.

(Continued)

*Primary Examiner*—Wing Chan
*Assistant Examiner*—Robert C Scheibel
(74) *Attorney, Agent, or Firm*—Banner & Witcoff, Ltd.

(57) ABSTRACT

A method of transmitting packets over a network includes steps of partitioning a transmission interval into discrete time slots and reaching agreement between a transmitting node and receiving node as to when the transmitting node will transmit packets. The intended receiving node sends a reception map to the transmitter indicating time slots that have not yet been allocated. The transmitter proposes a delivery schedule including time slots that it will use for transmission. After agreement by the receiving node, the transmitter transmits packets according to the agreed-upon schedule. Other transmitters can similar arrange to transmit during time slots not already allocated for the receiving node.

31 Claims, 9 Drawing Sheets

U.S. PATENT DOCUMENTS

| | | | |
|---|---|---|---|
| 5,974,056 A | 10/1999 | Wilson et al. | |
| 6,047,054 A | 4/2000 | Bayless et al. | |
| 6,058,117 A | 5/2000 | Ennamorato et al. | |
| 6,067,572 A | 5/2000 | Jensen et al. | |
| 6,088,361 A | 7/2000 | Hughes et al. | |
| 6,134,589 A | 10/2000 | Hultgren | |
| 6,208,666 B1 | 3/2001 | Lawrence et al. | |
| 6,240,084 B1 | 5/2001 | Oran et al. | |
| 6,247,061 B1 | 6/2001 | Douceur et al. | |
| 6,272,131 B1 | 8/2001 | Ofek | |
| 6,330,236 B1* | 12/2001 | Ofek et al. | 370/369 |
| 6,353,618 B1* | 3/2002 | Hung et al. | 370/459 |
| 6,359,885 B1 | 3/2002 | Kim et al. | |
| 6,373,822 B1 | 4/2002 | Raj et al. | |
| 6,377,579 B1 | 4/2002 | Ofek | |
| 6,385,198 B1 | 5/2002 | Ofek et al. | |
| 6,426,814 B1 | 7/2002 | Berger et al. | |
| 6,426,944 B1 | 7/2002 | Moore | |
| 6,480,506 B1 | 11/2002 | Gubbi | |
| 6,487,593 B2 | 11/2002 | Banks | |
| 6,496,477 B1 | 12/2002 | Perkins et al. | |
| 6,502,135 B1 | 12/2002 | Munger et al. | |
| 6,529,480 B1 | 3/2003 | Stewart et al. | |
| 6,556,564 B2 | 4/2003 | Rogers | |
| 6,560,222 B1 | 5/2003 | Pounds et al. | |
| 6,574,193 B1 | 6/2003 | Kinrot | |
| 6,611,519 B1* | 8/2003 | Howe | 370/386 |
| 6,618,360 B1 | 9/2003 | Scoville et al. | |
| 6,618,761 B2 | 9/2003 | Munger et al. | |
| 6,628,629 B1* | 9/2003 | Jorgensen | 370/322 |
| 6,633,544 B1 | 10/2003 | Rexford et al. | |
| 6,657,959 B1* | 12/2003 | Chong et al. | 370/230.1 |
| 6,711,137 B1 | 3/2004 | Klassen et al. | |
| 6,731,600 B1 | 5/2004 | Patel et al. | |
| 6,778,536 B1 | 8/2004 | Ofek et al. | |
| 6,788,702 B1* | 9/2004 | Garcia-Luna-Aceves et al. | 370/458 |
| 6,973,067 B1* | 12/2005 | Haartsen | 370/337 |
| 2001/0033565 A1 | 10/2001 | Rogers | |
| 2001/0033649 A1 | 10/2001 | Rogers | |
| 2002/0010792 A1 | 1/2002 | Border et al. | |
| 2002/0054611 A1 | 5/2002 | Seta | |
| 2002/0080719 A1 | 6/2002 | Parkvall et al. | |
| 2002/0086641 A1 | 7/2002 | Howard | |
| 2002/0110129 A1 | 8/2002 | Matsuoka et al. | |
| 2002/0186660 A1 | 12/2002 | Bahadiroglu | |
| 2002/0191592 A1 | 12/2002 | Rogers et al. | |
| 2003/0058880 A1 | 3/2003 | Sarkinen et al. | |
| 2003/0067903 A1 | 4/2003 | Jorgensen | |
| 2003/0107991 A1 | 6/2003 | Tezuka et al. | |
| 2003/0117959 A1 | 6/2003 | Taranov | |
| 2003/0188188 A1 | 10/2003 | Padmanabhan et al. | |
| 2003/0219029 A1 | 11/2003 | Pickett | |
| 2004/0008655 A1 | 1/2004 | Park et al. | |
| 2004/0014491 A1 | 1/2004 | Weigand | |
| 2004/0024550 A1 | 2/2004 | Doerken et al. | |
| 2004/0160340 A1 | 8/2004 | Thornson et al. | |
| 2004/0160916 A1 | 8/2004 | Vukovic et al. | |
| 2004/0179530 A1 | 9/2004 | Verbesselt et al. | |
| 2005/0058083 A1 | 3/2005 | Rogers | |
| 2005/0058137 A1* | 3/2005 | Carlson et al. | 370/395.4 |
| 2005/0086362 A1 | 4/2005 | Rogers | |

FOREIGN PATENT DOCUMENTS

| | | |
|---|---|---|
| JP | 04/056322 A | 2/2004 |
| WO | WO 00/28705 | 5/2000 |
| WO | WO 00/28706 | 5/2000 |
| WO | WO 01/47162 A1 | 6/2001 |
| WO | WO 01/50146 A1 | 7/2001 |
| WO | WO 01/59994 A1 | 8/2001 |
| WO | WO 01/60029 A1 | 8/2001 |
| WO | WO 02/41505 A2 | 5/2002 |
| WO | WO 02/100023 A2 | 12/2002 |
| WO | WO 03/084137 A2 | 10/2003 |

OTHER PUBLICATIONS

Self-Adjusted Network Transmission for Multimedia Data; Mei-Ling Shyu, Shu-Ching Chen, Hongli Luo; Abstract; 6pages, no update.

The Problem of Upstream Traffic Synchronization in Passive Optical Networks; Glen Kramer, Abstract pp. 1-7, no update.

Clark, M; Jeffay, K; Application—level Measurements of Performance on the vBNS Multimedia Computing and Systems, 1999. IEEE International Conference on Jun. 1999, vol. 2, 7-11, pp. 362-366 vol. 2.

Business Communications Review; Sep. 2003; "Circuit-y New Choices for IP Networks" pp. 18-24.

Packet Sequencing: A Layer -2 Wan Switching Technology for Per-Flow Ideal QoS and Secure IP Networking; Steven A. Rogers, Sean S.B. Moore and Curtis A. Siller, Jr.; Abstract pp. 1-6, no update.

Cetacean Networks; www.cetacean.com; "Cost-Effective IP Networks for High Quality Videoconferencing" Nov. 2002; pp. 1-9.

Copyright @ 2003, Cetacean Networks, Inc.; A Deterministic Protocol for QoS in IP Networks: Packet Sequencing; Steven A. Rogers, Sean S.B. Moore, Ph.D. and Curtis A. Siller, Jr. Ph.D.; Abstract pp. 1-18.

Copyright @ 2003; Packet Sequencing: IP Networks; Sean S.B. Moore, Ph.D.; Cetacean Networks, Inc.; pp. 98-107.

Copyright @ 2001; Practical Limits on Network Utilization In Converged IP Networks; Sean S.B. Moore, Ph.D. ; Cetacean Networks, Inc.; pp. 1-2.

Distributed Path Reservation Algorithms for Multiplexed all-Optical Interconnection Networks; X, Yuan, R. Melhem and R. Gupta; Abstract; 10 Pages, no update.

Cetacean Networks; www.cetacean.com, "Cost-Effective IP Networks for High Quality Videoconferencing" Nov. 2002; pp. 1-9.

The Desk Area Network; Mark Hayter and Derek MCAuley; May 1991; Abstract pp. 11.

Clark, M; Jeffay, K; Application—level Measurements of Performance on the vBNS Multimedia Computing and Systems; 1999; IEEE International Conference on Jun. 1999, vol. 2, 7-11, pp. 362-366 vol. 2.

PCT International Search Report dated May 24, 2006.

Yi Du and Gerald M. Masson, Enhancing accuracy of probe packet-based congestion detection in high sped networks, IEEE 1998.

* cited by examiner

ENDPOINT PACKET SCHEDULING SYSTEM

BACKGROUND OF THE INVENTION

The present invention relates generally to a system for allowing devices connected to a network to collaborate with each other so as to transmit and receive data packets without impairment on the network.

Ethernet and packet-switched Internet Protocol (IP) networks are systems for transmitting data between different points. These systems are known as "contention-based" systems. That is, all transmitters contend for network resources. All transmitters may transmit simultaneously. If they do, then network resources may be oversubscribed. When this happens, data may be delayed or lost, resulting in network impairment.

As shown in FIG. 1, a conventional network comprises a plurality of Local Area Network (LAN) endpoints, such as computers connected to an Ethernet LAN. The endpoints are coupled to one or more LAN switches 102, which connect through another part of the network to one or more additional LAN endpoints 103. When endpoint 101 sends packets to endpoint 103, the packets are sent through LAN switch 102, which also handles packets from other LAN endpoints. If too many packets are simultaneously transmitted by the other endpoints to 103, LAN switch 102 may have a queue overflow, causing packets to be lost. (The word "packets" will be used to refer to datagrams in a LAN or Wide Area Network (WAN) environment. In a LAN environment, packets are sometimes called "frames." In a packet-switched WAN environment, packet-switching devices are normally referred to as "routers.").

FIG. 2 illustrates the nature of the problem of dropped packets, which can occur in a LAN environment as well as a WAN environment. During periods where multiple endpoints are simultaneously transmitting packets on the network, the LAN switch 102 may become overloaded, such that some packets are discarded. This is typically caused by an internal queue in the LAN switch becoming full and thus becoming unable to accept new packets until the outgoing packets have been removed from the queue. This creates a problem in that transmitting endpoints cannot be guaranteed that their packets will arrive, necessitating other solutions such as the use of guaranteed-delivery protocols such as Transmission Control Protocol (TCP). Such solutions may be inappropriate for streaming video or other real-time applications, which cannot wait for retransmission of packets.

Another solution, proposed in my previous U.S. application Ser. No. 10/663,378, involves scheduling the transmission of packets by the originating endpoints based on an empirical evaluation of network congestion conditions. A transmission interval is partitioned into discrete frames and subframes, and each endpoint schedules packets for delivery during time slots in the subframes corresponding to empirically determined conditions of minimal network congestion. That scheme relies on the existence of multiple priority levels for packets in the network, such that packets can be sent using a lower-level "discovery" priority level to perform the empirical determination without affecting the higher-priority data traffic.

Some networks and devices cannot support multiple priority levels for data packets. For example, some packet switches may support only one level of packet priority (i.e., two queues: one for prioritized packets and another for non-prioritized packets), making such a scheme difficult to implement. Consequently, the present invention proposes a different solution to using a contention-based network, such as an Ethernet LAN or a WAN packet switching network, to transmit time-sensitive data such as streaming video.

SUMMARY OF THE INVENTION

The invention provides a method for transmitting packets in a network by scheduling them for delivery based on an agreement between the transmitting node and the receiving node as to a delivery schedule.

A transmitting node transmits a query to the intended receiving node. The receiving node responds with a reception map indicating what transmission time slots have already been allocated by other transmitting nodes (or, alternatively, what transmission time slots are available). The transmitting node then proposes a transmission map to the receiving node, taking into account any time slots previously allocated to other transmitting nodes. The receiving node either accepts the proposed transmission map or proposes an alternate transmission map. Upon agreement between the nodes, the transmitting node begins transmitting according to the proposed transmission map, and the receiving node incorporates the proposed transmission map into its allocation tables. Because the proposed delivery schedule has been agreed to between the two endpoints, uncoordinated contention that might otherwise overflow network switches near the endpoints is avoided. Because the schedule is determined by the two endpoints, no network arbiter is needed to coordinate among network resources.

In another variation, a transmitting node transmits a bandwidth requirement to an intended recipient node, indicating the bandwidth it requires to support a proposed transmission (e.g., streaming video packets). The intended recipient node, after evaluating time slots previously allocated to other transmitters, responds with a proposed delivery schedule indicating time slots during which the transmitter should transmit packets in order to avoid contention with other previously scheduled packets while maintaining the necessary bandwidth for the transmitter. The transmitter thereafter transmits packets according to the proposed delivery schedule.

In yet another variation, a transmitting node transmits a proposed delivery schedule to an intended recipient, indicating time slots corresponding to times during which it proposes to transmit packets. The intended recipient either agrees to the proposed delivery schedule, or proposes an alternate delivery schedule that takes into account the transmitter's bandwidth requirements. Upon agreement between the nodes, transmission occurs according to the agreed-upon delivery schedule. The schedule can be released at the end of the transmission.

DETAILED DESCRIPTION OF THE INVENTION

Figure 1:
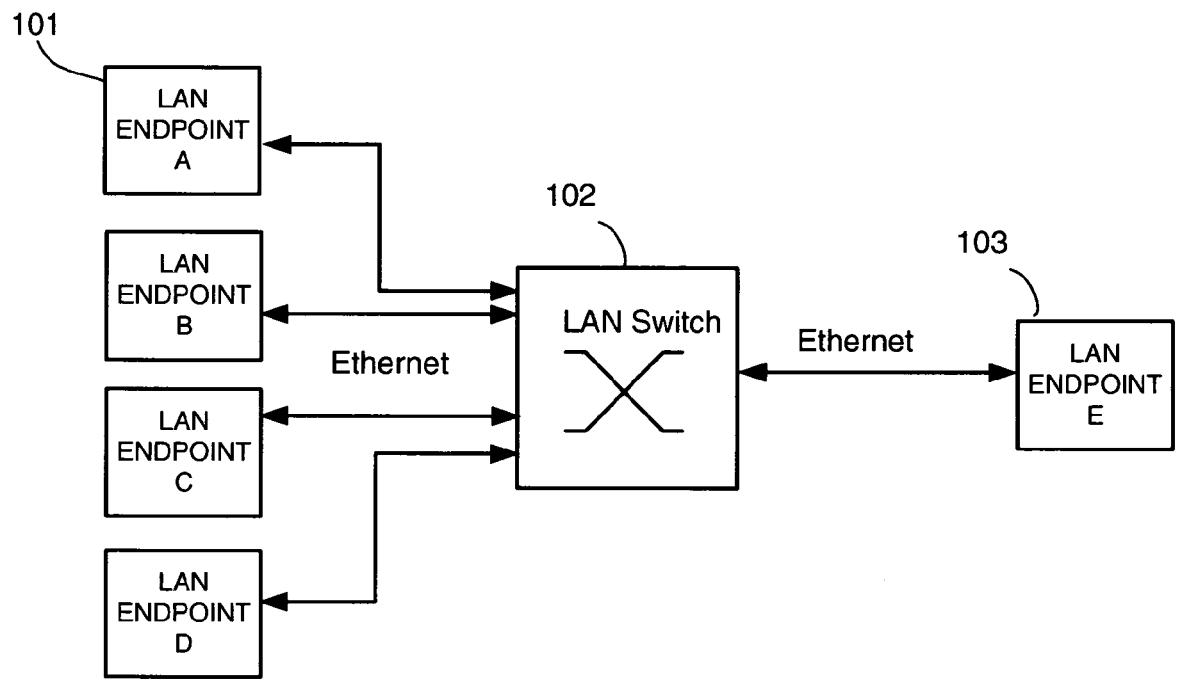
FIG. 1 shows the problem of bursty packets creating an overflow condition at a packet switch, leading to packet loss.
Figure 2:
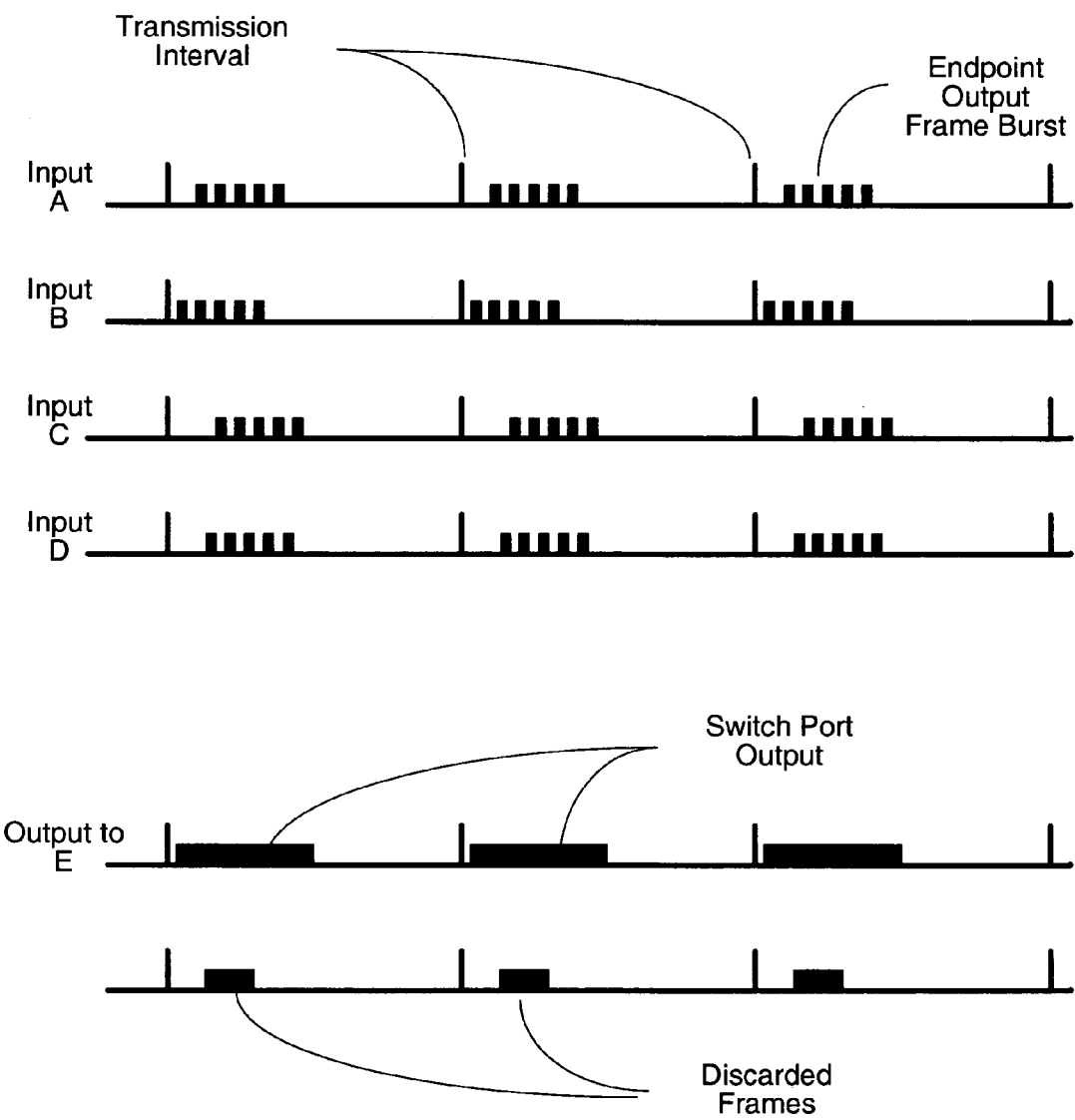
FIG. 2 shows how network congestion can cause packet loss where two sets of endpoints share a common network resource under bursty conditions.
Figure 3:
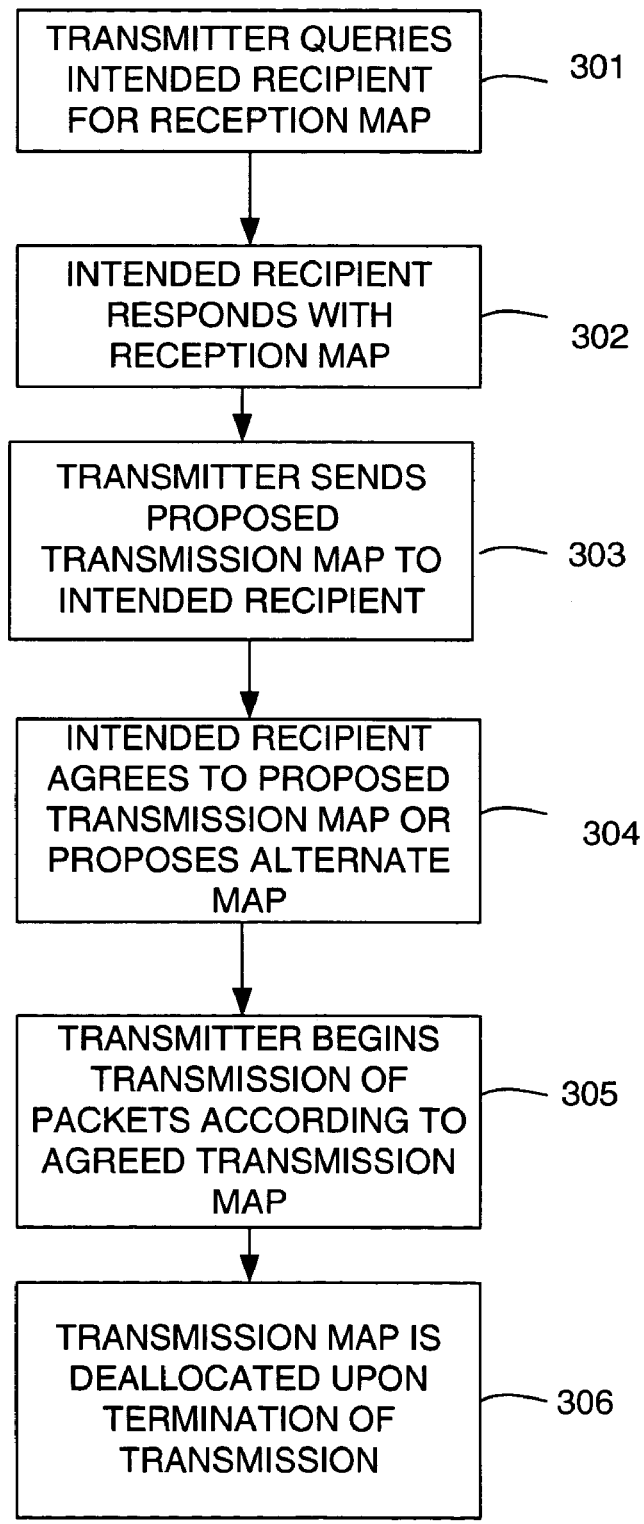
FIG. 3 shows one method for coordinating a delivery schedule for transmissions between a transmitting node and an intended recipient node.

FIG. 3 shows one method for carrying out the principles of the invention. Before describing this method, it is useful to explain how packets are scheduled for delivery over the network between nodes according to the invention.

Figure 6:
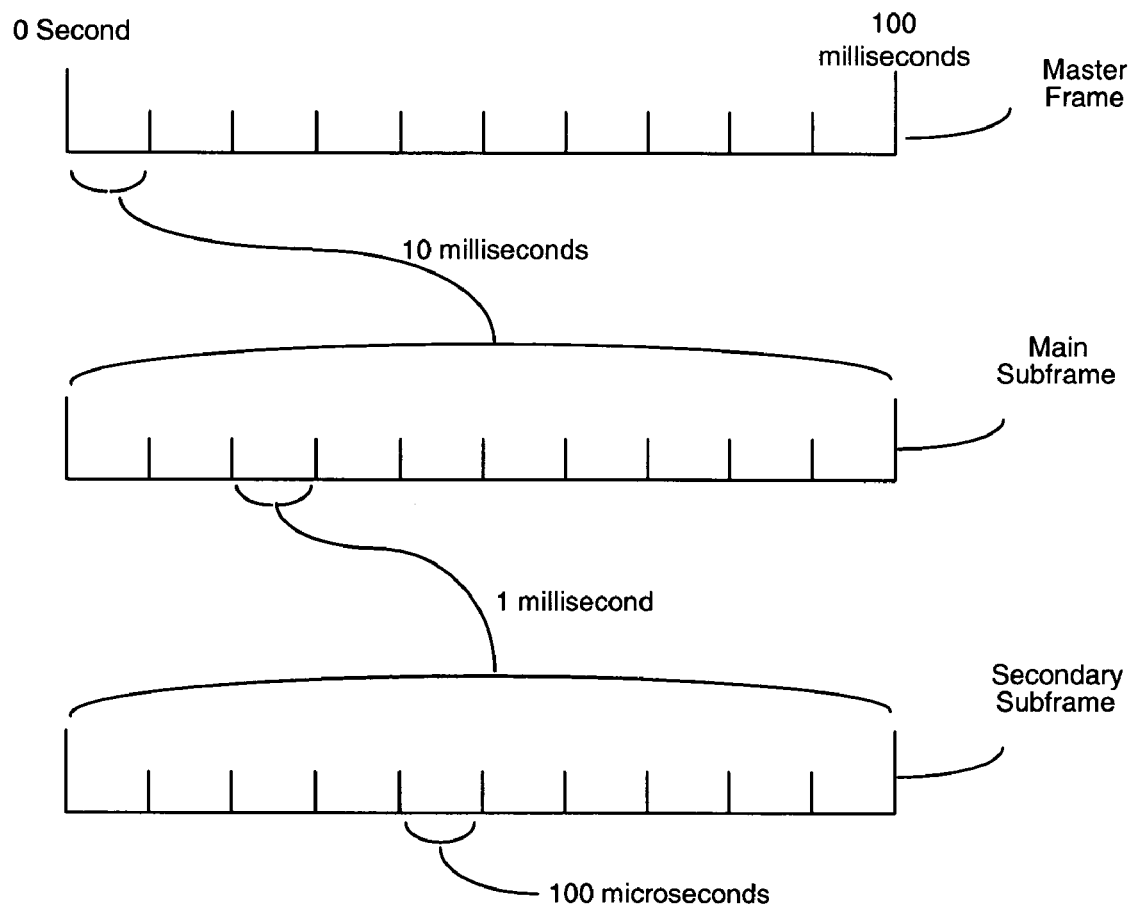
FIG. 6 shows a frame structure in which a transmission interval can be decomposed into a master frame; subframes; and secondary subframes, for a 10 megabit per second link.

Turning briefly to FIG. 6, a transmission interval is partitioned into units and (optionally) subunits of time during which data packets can be transmitted. In the example of FIG. 6, an arbitrary transmission interval one hundred milliseconds (a master frame) can be decomposed into subframes each of 10 millisecond duration, and each subframe can be further decomposed into secondary subframes each of 1 millisecond duration. Each secondary subframe is in turn divided into time slots of 100 microsecond duration. Therefore, a period of 100 milliseconds would comprise 1,000 slots of 100 microseconds duration. According to one variation of the invention, the delivery time period for each unit of transmission bandwidth to a receiving node is decomposed using a scheme such as that shown in FIG. 6, and packets are assigned for transmission to time slots according to this schedule. This scheme is analogous to time-division multiplexing (TDM) in networks.

Depending on the packet size and underlying network bandwidth, some varying fraction of each time slot would be actually used to transmit a packet. Assuming a packet size of 125 bytes (1,000 bits) and a 10BaseT Ethernet operating at 10 mbps, a single 100-microsecond time slot would be used to transmit each packet. Assuming a packet size of 1,500 bytes, twelve of the 100-microsecond intervals would be consumed by each packet transmission.

According to one variation of the invention, the scheduled delivery scheme applies to prioritized packets in the network; other non-prioritized packets are not included in this scheme. Therefore, in a system that supports only priority traffic and non-priority traffic, the scheduled delivery scheme would be applied to all priority traffic, and ad-hoc network traffic would continue to be delivered on a nonpriority basis. In other words, all priority traffic would be delivered before any nonpriority traffic is delivered.

The delivery schedule of FIG. 6 is intended to be illustrative only; other time period schemes can be used. For example, it is not necessary to decompose a transmission interval into subframes as illustrated; instead, an arbitrary interval can be divided up into 100-microsecond time slots each of which can be allocated to a particular transmitting node. Other time periods could of course be used, and the invention is not intended to be limited to any particular time slot scheme. The delivery schedule can be derived from a clock such as provided by a Global Positioning System (GPS). The means by which time slots are synchronized in the network is discussed in more detail below.

Suppose that a transmitting node needs to support a voice connection over the network. For a single voice-over-IP connection, a bandwidth of 64 kilobits per second might be needed. Assuming a packet size of 80 bytes or 640 bits, this would mean that 100 packets per second must be transmitted, which works out to (on average) one packet every 10 milliseconds. In the example of FIG. 6, this would mean transmitting a packet during at least one of the time slots in every tenth secondary subframe at the bottom of the figure. (Each time slot corresponds to 100 microseconds, so on average, one packet every 10 milliseconds would be needed, or one packet every ten secondary subframes).

Returning to FIG. 3, in step 301, a transmitting node sends a query to an intended receiving node in the network for a reception map.

Figure 7:
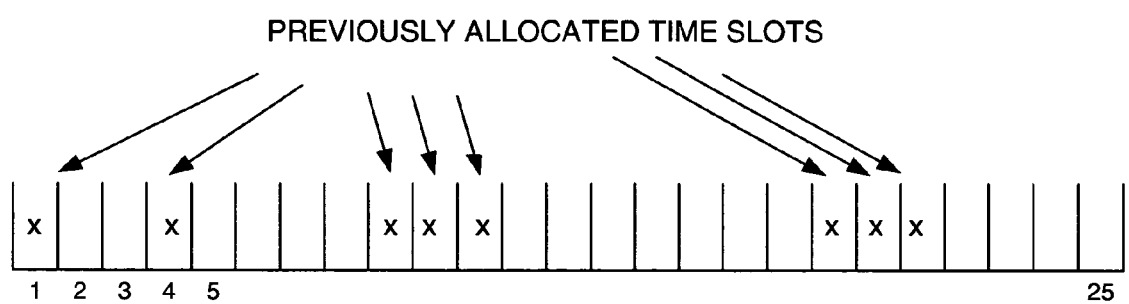
FIG. 7 shows one possible reception map for a given transmission interval.

A reception map (see FIG. 7) is a data structure indicating time slots that have already been allocated to other transmitters for reception by the receiving node (or, alternatively, time slots that have not yet been allocated, or, alternatively, time slots that are candidates for transmission). More generally, a reception map is a data structure that indicates—in one form or another—time slots during which transmission to the intended receiving node would not conflict with other transmitters. Although there are many ways of representing such a map, one approach is to use a bitmap wherein each bit corresponds to one time slot, and a "1" indicates that the time slot has been allocated to a transmitting node, and a "0" indicates that the time slot has not yet been allocated. FIG. 7 thus represents 25 time slots of a delivery schedule, and certain time slots (indicated by an "x" in FIG. 7) have already been allocated to other transmitters. If a 100-millisecond delivery interval were divided into 100-microsecond time slots, there would be 1,000 bits in the reception map. This map could be larger, for higher bandwidths. For instance, for a 100 megabit per second link, the map could have 10,000 bits, etc., to represent the same throughput per slot.

In step 302, the intended receiving node responds with a reception map such as that shown in FIG. 7, indicating which time slots have already been allocated to other transmitters. If this were the first transmitter to transmit to that receiving node, the reception map would be empty. It is of course also possible that time slots could have been previously allocated to the same transmitter to support an earlier transmission (i.e., the same transmitter needs to establish a second connection to the same recipient).

In step 303, the transmitter sends a proposed transmission map to the intended receiving node. The proposed transmission map preferably takes into account the allocated time slots received from the intended receiving node, so that previously allocated time slots are avoided. The transmitter allocates enough time slots to support the required bandwidth of the transmission while avoiding previously allocated time slots.

Suppose that a virtual connection is to be established between two nodes on the network to support a telephone voice connection. A voice-over-IP connection may require 64 kilobits per second transfer rate using 80-byte packet payloads (not including packet headers). A video stream would typically impose higher bandwidth requirements on the network. On an Ethernet LAN, each packet would comprise up to 1,500 bytes, which (at 10BaseT rates) could be transmitted in approximately 12 100-microsecond periods or slots. A voice-over-IP connection could be established by transmitting one 80-byte payload packet every 10 milliseconds.

In step 304, the intended recipient reviews the proposed transmission map and agrees to it, or proposes an alternate transmission map. For example, if the intended recipient had allocated some of the proposed time slots to another transmitter during the time that the transmitter was negotiating for bandwidth, the newly proposed delivery schedule might present a conflict. In that situation, the intended recipient might propose an alternate map that maintained the bandwidth requirements of the transmitter.

In step 305, the transmitter repeatedly transmits to the intended recipient according to the agreed delivery schedule. To support a voice-over-IP connection, for example, the transmitter could transmit an 80-byte packet every 10 milliseconds. For a streaming video connection, the transmitter could transmit at a more frequent rate. Finally, in step 306 the receiver's map is deallocated when the transmitter no longer needs to transmit.

Note that for two-way communication, two separate connections must be established: one for node A transmitting to node B, and another connection for node B transmitting to node A. Although the inventive principles will be described with respect to a one-way transmission, it should be understood that the same steps would be repeated at the other endpoint where a two-way connection is desired.

Figure 4:
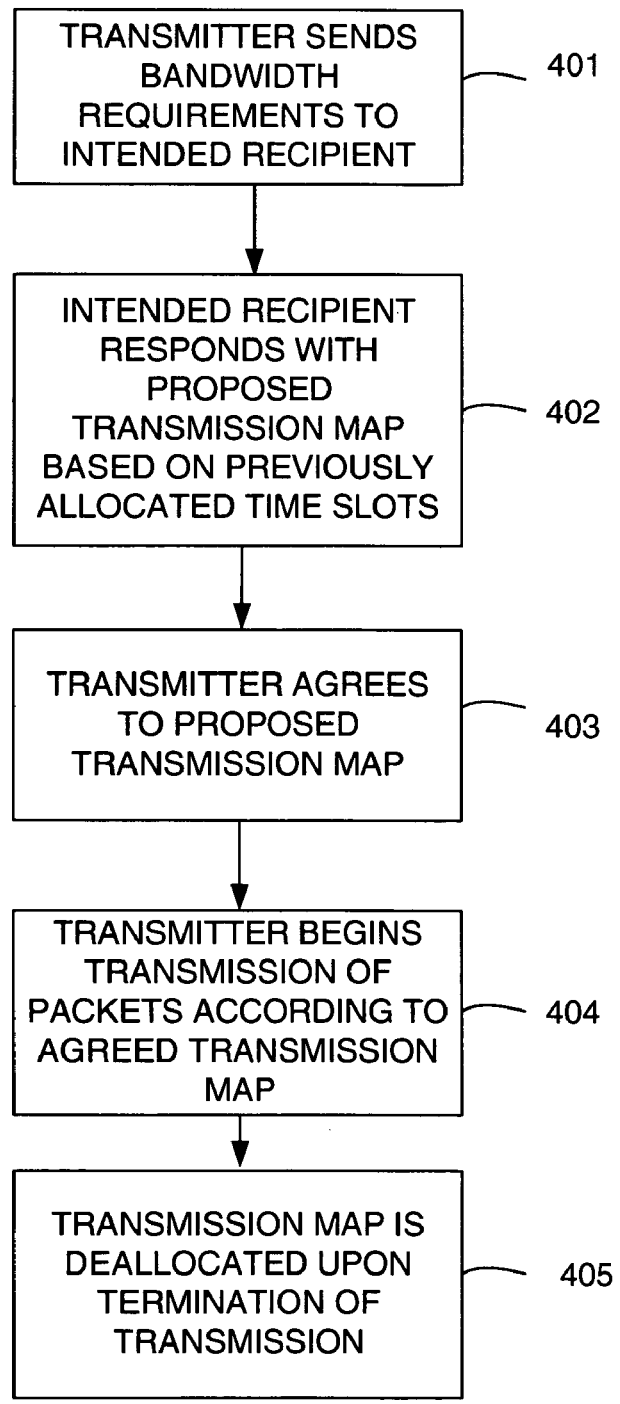
FIG. 4 shows a second method for coordinating a delivery schedule for transmissions between a transmitting node and an intended recipient node.

FIG. 4 shows an alternative method for carrying out the inventive principles. Beginning in step 401, the transmitter sends a bandwidth requirement to the intended recipient. For example, the transmitter may dictate a packet size and bandwidth, and the intended recipient could determine which slots should be allocated to support that bandwidth. In step 402, the intended recipient responds with a proposed transmission map that takes into account previously allocated time slots.

In step 403, the transmitter agrees to the proposed transmission map, causing the intended receiver to "lock in" the agreed time slots (this step could be omitted), and in step 404 the transmitter transmits packets according to the agreed-upon schedule. Finally, in step 405 the transmission map is deallocated upon termination of the connection.

Figure 5:
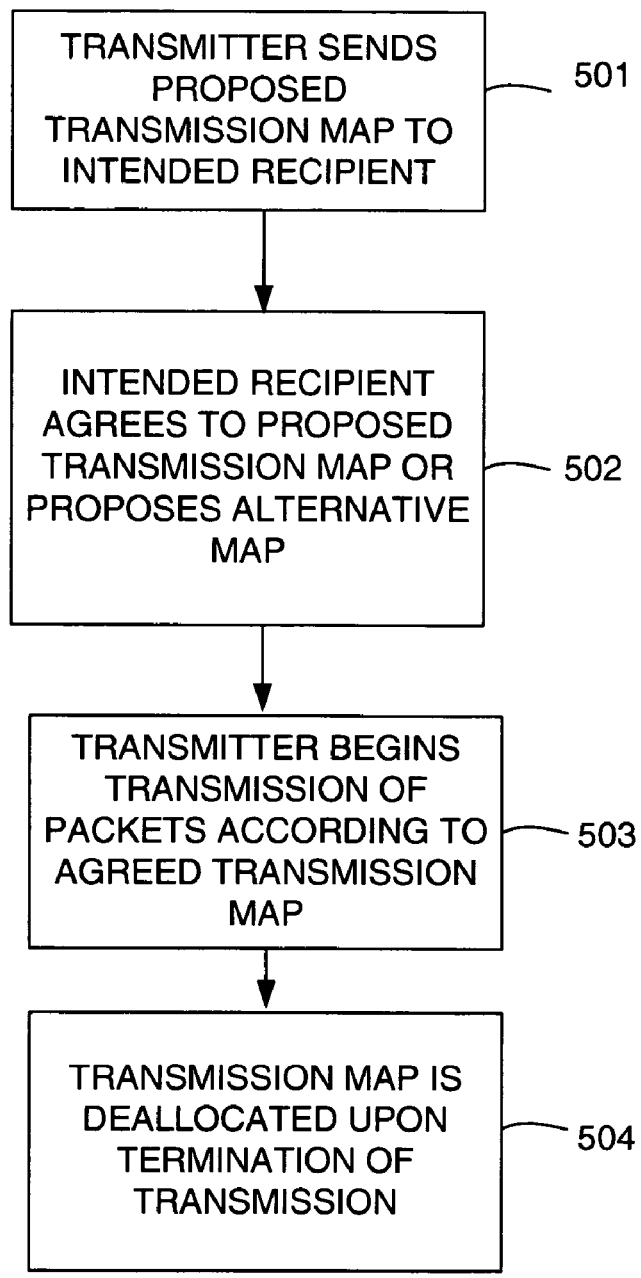
FIG. 5 shows a third method for coordinating a delivery schedule for transmissions between a transmitting node and an intended recipient node.

FIG. 5 shows another variation of the inventive method. In step 501, the transmitting node sends a proposed transmission map to the intended recipient. In step 502, the intended recipient either agrees to the proposed transmission map (if it is compatible with any previously-allocated maps) or proposes an alternative map that meets the transmitter's bandwidth requirements, which can be inferred from the proposed transmission map. For example, if the transmitter had proposed transmitting in time slots 1, 11, 21, 31, 41, and so forth, it would be evident that the transmitter needed to transmit once every tenth time slot. If the requested slots were not available, the intended recipient could instead propose slots 2, 12, 22, 32, and so forth.

In step 503, the transmitter transmits packets according to the agreed-upon delivery schedule, and in step 504 the transmission map is deallocated upon termination of the transmission.

In another variation, a transmitter may request bandwidth (e.g., one 1000-byte packet every 10 milliseconds) and the receiver responds with a placement message (e.g., start it at the 75th 100-microsecond slot). The receiver could also respond with multiple alternatives (e.g., start it at the 75th, the 111th, or the 376th time slot). The transmitter would respond with the time slot that it intended to use (e.g., the 111th), and begin transmission. This variation is intended to be within the scope of sending "transmission maps" and "reception maps" as those terms are used herein.

Figure 8:
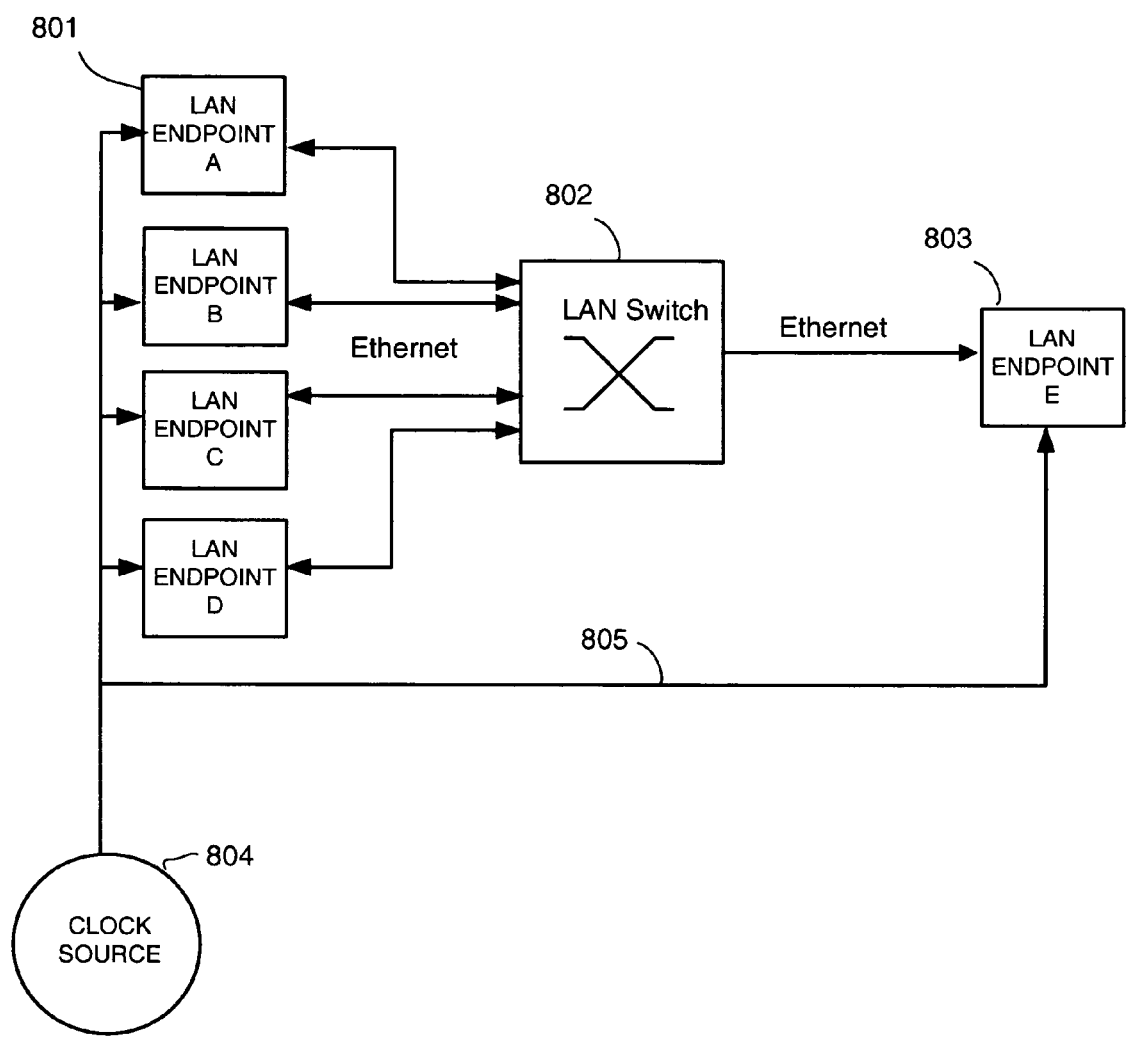
FIG. 8 shows a scheme for synchronizing delivery schedules among network nodes.

In order for each transmitter and receiver to agree on a delivery schedule, it is desirable or necessary to develop and maintain some time synchronization between the nodes. FIG. 8 shows one possible approach for synchronizing delivery schedules among nodes in a network.

As shown in FIG. 8, the network comprises various endpoints connected through a switch 802. According to one variation of the invention, a clock source 804 (e.g., a GPS-derived clock) is coupled through an electrical wire 805 to each network node participating in the scheduled delivery scheme. The clock source generates pulses that are transmitted to each node and used as the basis for the delivery schedule. Each node may comprise a timer card or other mechanism (e.g., an interrupt-driven operating system) that is able to use the timing signals to establish a common reference frame. This means for synchronizing may therefore comprise a physical wire (separate and apart from the network) over which a synchronization signal is transmitted to each node. It may further comprise a hardware card and/or software in each node to detect and decode the synchronization signal.

The clock pulses may comprise a pulse according to an agreed-upon interval (e.g., one second) that is used by each node to generate time slots that are synchronized to the beginning of the pulses. Alternatively, the clock source may generate a high-frequency signal that is then divided down into time slots by each node. Other approaches are of course possible. As yet another alternative, each node may contain its own clock source that is synchronized (via GPS or other means) to a common reference signal, such as a radio signal transmitted by the U.S. Government. Wire 805 may comprise a coaxial cable or other means of connecting the clock source to the nodes. In one variation, the connection is of a short enough distance (hundreds of feet) so that transmission effects and delays are avoided. Any of these means for synchronizing may be used independently of the others.

Another way or means of synchronizing time slots and delivery schedules among the nodes is to have one node periodically transmit (e.g., via multicast) a synchronization packet on the node on the network. Each node would receive the packet and use it to synchronize an internal clock for reference purposes. As an alternative to the multicast approach, one network node can be configured to individually send synchronization packets to each participating network node, taking into account the stagger delay involved in such transmission. For example, a synchronization node would transmit a synchronization packet to a first node on the network, then send the same packet to a second node on the network, which would be received later by the second node. The difference in time could be quantified and used to correct back to a common reference point. Other approaches are of course possible.

Figure 9:
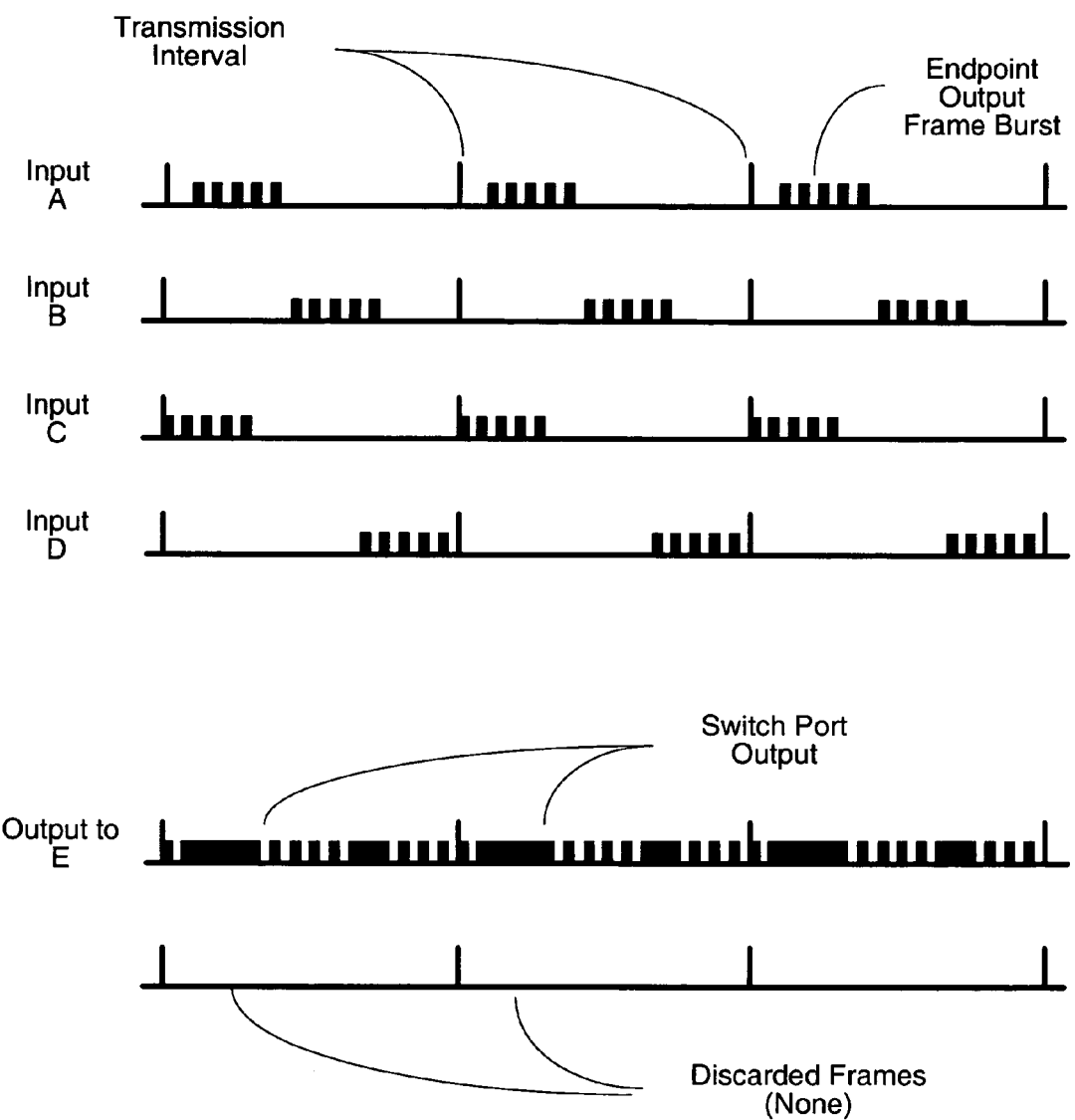
FIG. 9 shows how network congestion is avoided through the use of the inventive principles, leading to more efficient scheduling of packets in the network.

FIG. 9 illustrates how practicing the inventive principles can reduce congestion by more efficiently scheduling data packets between transmitters and receivers. As shown in FIG. 9, because each transmitting node schedules packets for delivery during times that do not conflict with those transmitted by other nodes, no packets are lost.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein can be implemented in computer software and stored on computer-readable medium for execution in a general-purpose or special-purpose computer, and such computer-readable media is included within the scope of the intended invention. The invention extends to not only the method but also to computer nodes programmed to carry out the inventive principles. Numbering associated with process steps in the claims is for convenience only and should not be read to imply any particular ordering or sequence.

I claim:

1. A method of transmitting Internet Protocol (IP) or Ethernet packets over a packet-switched computer network, comprising the steps of:
   (1) from a transmitting network endpoint, transmitting through the packet-switched computer network a query to an intended receiving network endpoint;
   (2) receiving from the intended receiving network endpoint a reception map indicating time slots during which transmission to the intended receiving network endpoint would not conflict with other transmitting endpoints and wherein the reception map is generated without schedule coordination among network resources;
   (3) from the transmitting network endpoint, transmitting to the intended receiving network endpoint a proposed transmission map indicating time slots, compatible with the reception map, during which the transmitting network endpoint intends to transmit packets, wherein the proposed transmission map is generated without schedule coordination among network resources; and
   (4) from the transmitting network endpoint, synchronously transmitting packets including packet headers to the intended receiving network endpoint through the network according to the proposed transmission map without schedule coordination among network resources.

2. The method of claim 1, further comprising the steps of, prior to step (4), receiving an agreement from the intended receiving network endpoint and, if no agreement is received, transmitting in step (4) according to an alternative transmission map.

3. The method of claim 2, wherein the alternative transmission map is proposed by the intended receiving network endpoint.

4. The method of claim 1, wherein step (4) comprises the step of repeatedly transmitting packets to the intended receiving network endpoint according to the proposed transmission map.

5. The method of claim 1, further comprising the step of, at the intended receiving network endpoint, generating the reception map on the basis of previously allocated time slots from other transmitting network endpoints.

6. The method of claim 5, wherein the reception map comprises a bitmap, wherein each bit corresponds to one of a plurality of timeslots, each bit indicating whether that corresponding timeslot has previously been allocated.

7. The method of claim 1, further comprising the step of periodically synchronizing, as between the transmitting network endpoint and the receiving network endpoint, a time period on which the proposed transmission map is used in step (4) and without synchronization among network resources.

8. The method of claim 7, wherein the synchronizing step comprises the step of using a connection over which a synchronization signal is transmitted, separate and apart from any network connection.

9. The method of claim 7, wherein the synchronizing step comprises the step of transmitting synchronization packets over the network.

10. A method of transmitting Internet Protocol (IP) or Ethernet packets over a packet-switched computer network, comprising the steps of:
    (1) from a transmitting network endpoint, transmitting a bandwidth requirement to an intended receiving network endpoint;
    (2) receiving from the intended receiving network endpoint a transmission map indicating time slots during which transmission to the intended receiving network endpoint would not conflict with other transmitting network endpoints, wherein the transmission map is generated without schedule coordination among network resources; and
    (3) from the transmitting network endpoint, synchronously transmitting packets including packet headers to the intended receiving network endpoint over the computer network according to the transmission map without schedule coordination among network resources.

11. The method of claim 10, further comprising the step of, at the intended receiving network endpoint, generating the transmission map based on the bandwidth requirement transmitted from the transmitting network endpoint.

12. The method of claim 10, further comprising the step of synchronizing between the transmitting network endpoint and the intended receiving network endpoint a time period on which the transmission map is used and without synchronization among network resources.

13. The method of claim 12, wherein the synchronizing step comprises the step of using an electrical connection over which a synchronization signal is transmitted, separate and apart from any network connection.

14. The method of claim 12, wherein the synchronizing step comprises the step of transmitting synchronization packets over the network.

15. A method of transmitting Internet Protocol (IP) or Ethernet packets over a packet-switched computer network, comprising the steps of:
    (1) from a transmitting network endpoint, transmitting through the packet-switched computer network a proposed delivery schedule to an intended receiving network endpoint, wherein the proposed delivery schedule indicates time slots corresponding to times during which the transmitting network endpoint proposes to transmit packets to the intended receiving network endpoint and wherein the proposed delivery schedule is generated without schedule coordination among network resources;
    (2) receiving from the intended receiving network endpoint an indication as to whether the proposed delivery schedule is acceptable to the intended receiving network endpoint; and
    (3) if the proposed delivery schedule is acceptable, synchronously transmitting packets including packet headers from the transmitting network endpoint to the intended receiving network endpoint according to the proposed delivery schedule and without schedule coordination among network resources.

16. The method of claim 15, further comprising the step of, upon determining that the proposed delivery schedule is not acceptable to the intended receiving network endpoint, receiving from the intended receiving network endpoint an alternate delivery schedule and using the alternate delivery schedule to transmit the packets in step (3).

17. The method of claim 15, further comprising the step of, at the intended receiving network endpoint, determining whether the proposed delivery schedule is acceptable by comparing time slots proposed to be used by the transmitting network endpoint to previously allocated time slots allocated by other transmitting network endpoints.

18. The method of claim 15, further comprising the step of synchronizing between the transmitting network endpoint and the intended receiving network endpoint a time period on which the delivery schedule is used and without synchronization among network resources.

19. The method of claim 18, wherein the synchronizing step comprises the step of using an electrical connection over which a synchronization signal is transmitted, separate and apart from any network connection.

20. The method of claim 18, wherein the synchronizing step comprises the step of transmitting synchronization packets over the network.

21. A computer comprising a processor connected to a computer-readable medium, said computer readable-medium having stored therein executable instructions that, when executed, perform the following steps:
   (1) transmitting from an originating network endpoint over a packet-switched network to an intended receiving network endpoint a proposed delivery schedule, wherein the proposed delivery schedule indicates time slots corresponding to times during which the computer proposes to transmit packets to the intended receiving network endpoint and wherein the proposed delivery schedule is generated without schedule coordination among network resources;
   (2) receiving from the intended receiving network endpoint an indication as to whether the proposed delivery schedule is acceptable to the intended receiving network endpoint and without schedule coordination among network resources; and
   (3) if the proposed delivery schedule is acceptable to the intended receiving network endpoint, synchronously transmitting Internet Protocol (IP) or Ethernet packets includinig packet headers to the intended receiving network endpoint over the cornputer network according to the proposed delivery schedule and without schedule coordination among network resources.

22. The computer according to claim 21, further comprising executable instructions that, when executed, perform the step of receiving from the intended receiving network endpoint an alternative delivery schedule and using the alternative delivery schedule as the basis for transmitting packets in step (3).

23. The computer according to claim 21, further comprising means for synchronizing the proposed delivery schedule with the intended receiving network endpoint without synchronization among network resources.

24. The computer according to claim 23, wherein the means comprises a connection linked to the intended receiving network endpoint, wherein the connection is separate from any network connection to the intended receiving network endpoint.

25. The computer according to claim 23, wherein the means comprises executable instructions that process a synchronization packet transmitted over a network connection with the intended receiving network endpoint.

26. A method of transmitting Internet Protocol (IP) or Ethernet packets over a network comprising at least one network switch, comprising the steps of:
   (1) from a transmitting network endpoint, transmitting a query to an intended receiving network endpoint over the network;
   (2) at the intended receiving network endpoint, generating a reception map indicating which of a plurality of discrete time slots have been previously allocated for transmission of packets to that intended receiving network endpoint, wherein each time slot represents a unit of time within a transmission interval over the network, and wherein the reception map is generated without schedule coordination with the at least one network switch;
   (3) transmitting the reception map from the intended receiving network endpoint to the transmitting network endpoint;
   (4) from the transmitting network endpoint, transmitting to the intended receiving network endpoint a proposed transmission map indicating time slots, compatible with the reception map, during which the transmitting node intends to transmit packets to the intended receiving network endpoint over the network, wherein the proposed transmission map is generated without schedule coordination with the at least one network switch;
   (5) from the transmitting network endpoint, synchronously transmitting through the at least one network switch packets including packet headers to the intended receiving network endpoint according to the proposed transmission map; and
   (6) maintaining time synchronization as to the discrete time slots between the transmitting network endpoint and the receiving network endpoint through the use of an electrical connection that is separate and apart from any network connection between the transmitting network endpoint and the intended receiving network endpoint and without schedule synchronization with the at least one network switch.

27. The method of claim 1, wherein steps (1) through (4) are performed over a packet-switched network comprising a plurality of network switches, and wherein steps (2) through (4) are performed without schedule coordination among the plurality of network switches.

28. The method of claim 10, wherein steps (1) through (3) are performed over a packet-switched network comprising a plurality of network switches, and wherein steps (2) and (3) are performed without schedule coordination among the plurality of network switches.

29. The method of claim 15, wherein steps (1) through (3) are performed over a packet-switched network comprising a plurality of network switches, and wherein steps (2) and (3) are performed without schedule coordination among the plurality of network switches.

30. The computer of claim 21, wherein steps (1) through (3) are performed over a packet-switched network comprising a plurality of network switches, and wherein steps (1) through (3) are performed without schedule coordination among the plurality of network switches.

31. The method of claim 26, wherein steps (2) through (6) are performed over a packet-switched network comprising a plurality of network switches and without schedule coordination among the plurality of network switches.

* * * * *